United States Patent

Sakane et al.

[11] 4,054,435
[45] Oct. 18, 1977

[54] METHOD OF CRYSTALLIZING A TWO LAYER GLASS ARTICLE

[75] Inventors: Takashi Sakane, Otsu; Shigeharu Nakamura, Shiga, both of Japan

[73] Assignee: Nippon Electric Glass Company, Limited, Otsu, Japan

[21] Appl. No.: 732,451

[22] Filed: Oct. 14, 1976

[51] Int. Cl.² .................. C03B 23/20; C03B 19/08; C03B 32/00
[52] U.S. Cl. .......................... 65/18; 65/22; 65/33
[58] Field of Search ................ 65/22, 33, 18

[56] References Cited

U.S. PATENT DOCUMENTS

| | | | |
|---|---|---|---|
| 400,048 | 3/1889 | Bryan | 65/22X |
| 1,117,601 | 11/1914 | Porter | 65/22 X |
| 1,922,221 | 8/1933 | Steenbeck et al. | 65/22 X |
| 1,929,425 | 10/1933 | Hermann | 65/22 X |
| 1,930,340 | 10/1933 | Ellis et al. | 65/22 X |
| 2,205,534 | 6/1940 | Lytle | 65/22 X |
| 2,377,074 | 5/1945 | Ford | 65/22 X |
| 2,629,161 | 2/1953 | Kistler | 65/18 |
| 2,751,289 | 6/1956 | Elliott | 65/22 X |
| 2,837,873 | 6/1958 | Lynsavage | 65/22 |
| 3,666,506 | 5/1972 | Cowan, Jr. et al. | 65/22 X |
| 3,811,852 | 5/1974 | Bondarev et al. | 65/33 X |
| 3,955,989 | 5/1976 | Nakamura | 65/33 X |
| 3,975,174 | 8/1976 | Camerlinck | 65/22 |

*Primary Examiner*—S. Leon Bashore
*Assistant Examiner*—Frank W. Miga
*Attorney, Agent, or Firm*—Kurt Kelman

[57] ABSTRACT

A crystallized glass article formed of discrete small bodies of crystallizable glass fusion-bonded together at their interfaces is characterized in that a first layer extending from the article surface to a predetermined depth is non-porous, a predetermined thickness of second layer connected to and beneath the first layer being porous. Each of the small bodies in the first layer has needle-like β-wollastonite crystals extending from the surface of the body to the interior thereof in a direction perpendicular to the surface of the body. Accordingly the article is characterized by a surface pattern defined by small bodies due to the differences of orientation of needle-like β-wollastonite crystals and by a reduced specific gravity.

6 Claims, 5 Drawing Figures

METHOD OF CRYSTALLIZING A TWO LAYER GLASS ARTICLE

BACKGROUND OF THE INVENTION

This invention relates to crystallized glass articles having a surface pattern.

Crystallized glasses formed by the heat-treatment of glasses have attracted a great attention as heat-resistant, incombustible wall materials for buildings and the like because of great mechanical strength, excellent heat resistance and excellent efflorescence resistance.

A crystallized glass article having a desired surface pattern is disclosed in our British Pat. No. 1,427,792.

The crystallized glass article disclosed in the British patent is formed of discrete bodies of crystallizable glass fusion-bonded together along their interfaces, a plurality of adjacent bodies forming a surface layer of the article, each of the bodies having needle-like $\beta$-wollastonite crystals, formed by heat-treatment, extending from the surface thereof into the interior thereof in a direction generally perpendicular to the surface of the body, and the crystals extending generally parallel to the surface of the glass article in the region of each interface between a pair of adjacent fusion-bonded bodies and being generally perpendicular to the surface of the glass article between the interfaces, in regions where a surface portion of a body is exposed, whereby a surface pattern defined by the bodies forming the surface layer is provided on the glass article.

The crystallized glass article is obtained by heat-treating discrete bodies of crystallizable glass packed in a mold at a temperature higher than the softening point of the glass but lower than the liquidus temperature thereof, each of the bodies having the property that when heat-treated at a temperature higher than the softening point of the glass but lower than the liquidus temperature thereof needle-like wollastonite crystals are formed, the crystals extending from the surface into the interior of the body in a direction generally perpendicular to the surface of the body while it is being softened and deformed.

The crystallized glass article is non-porous, as will be noted from the specific gravity indicated in TABLE in the specification in the British patent in comparison with the specific gravity of product by rolling method.

When the crystallized glass articles are used as wall plates for buildings, they have disadvantages that they are difficult in transporting and mounting the plates because of their weightness. They have another disadvantage that they are hard to be machined or cut to a desired shape or dimensions because of their hardness.

SUMMARY OF THE INVENTION

Accordingly, an object of this invention is to provide crystallized glass articles having a surface pattern with a reduced specific gravity and which can be easily machined.

Another object of this invention is to provide a sound proof and heat insulation crystallized glass article.

Still another object of this invention is to provide a crystallized glass article comprising a first non-porous crystallized glass layer having a surface pattern and extending from a surface of the article to a predetermined depth and a second porous crystallized layer having a predetermined thickness and being connected beneath the first layer, to achieve the above described objects.

A crystallized glass article of this invention comprises a first non-porous layer extending from a surface of the article to a predetermined depth, and a second porous layer having a predetermined thickness and being connected beneath the first layer. The first layer being formed of first discrete small bodies of crystallizable glass fusion-bonded together along their interfaces, a plurality of adjacent bodies forming a surface layer of the first layer. Each of the first bodies has needle-like $\beta$-wollastonite crystals, formed by heat-treatment, extending from the surface thereof into the interior thereof in a direction generally perpendicular to the surface of the first body. The crystals extend generally parallel to the surface of the first layer in the region of each interface between a pair of adjacent fusion-bonded first bodies and are generally perpendicular to the surface of the first layer between the interfaces, in regions where a surface portion of each one of the first body is exposed whereby a surface pattern defined by the first bodies forming the surface layer is provided on the glass article. The second layer comprises second discrete small bodies of crystallizable glass fusion-bonded together and maintaining pores uniformly distributed in the second layer. A plurality of the second bodies adjacent to and beneath the first layer being fusion-bonded to adjacent first bodies to connect the second layer with the first layer.

The crystallized glass article of this invention is produced by the steps of preparing first discrete small bodies of crystallizable glass, each of said first bodies having a property that when heat-treated at a temperature higher than the softening point of the glass but lower than the liquidus temperature thereof needle-like $\beta$-wollastonite crystals are foamed, said crystals extending from the surface into the interior of the body in a direction generally perpendicular to the surface of the body while it is being softened and deformed, preparing a mixture of second discrete small bodies and pore forming materials uniformly distributed in said mixture, each of said second bodies having a property that when heat-treated at said temperature higher than the softening point of said first body glass but lower than the liquidus temperature of said first body glass crystals are formed while it is being softened and deformed, packing said first bodies and said mixture into a mold to form a first layer of said first bodies extending from a surface of the pack to a predetermined depth and a predetermined thickness of second layer of said mixture beneath said first layer, heat-treating said first bodies and said mixture in said mold at a temperature higher than the softening point of said first body glass but lower than the liquidus temperature of said first body glass until needle-like $\beta$-wollastonite crystals are formed in each first body and first bodies and second bodies are fusion-bonded together, and thereafter cooling the resultant fusion-bonded body, whereby a crystallized glass article is obtained which comprises a first non-porous layer extending from a surface of the article to a predetermined depth and being characterized by a surface pattern defined by said first bodies forming a surface layer of said first layer due to a difference of orientation of the needle-like $\beta$-wollastonite crystals, and a second porous layer having a predetermined thickness beneath said first non-porous layer and being connected to said first non-porous layer.

As a crystallizable glass used in this invention, a glass of the $CaO-Al_2O_3-SiO_2$ type may be employed, i.e., glasses comprising 15–40 wt.% CaO, 3–13 wt.% $Al_2O_3$ , 40–75 wt.% $SiO_2$, the total of the CaO, $Al_2O_3$ and $SiO_2$ being at least 90% by weight of the total crystallizable glass, the balance, if any, consisting of other compatible constituents. Alternatively, glasses of the CaO-$Al_2O_3$-$SiO_2$-ZnO systems may be employed, i.e., glasses comprising 50–60 wt.% $SiO_2$, 3–13 wt.% $Al_2O_3$, 15–25 wt.% CaO, 2–10 wt.% ZnO, the balance, if any, consisting of other compatible oxides.

Glasses comprising 45–75 wt.% $SiO_2$, 1–13 wt.% $Al_2O_3$, 6–14.5 wt.% CaO, 1–13 wt.% $Na_2O + K_2O$, 0–20 wt.% BaO, 0–18 wt.% ZnO (total of ZnO and BaO being 4–24 wt.%), the balance, if any, consisting of other compatible oxides, may be advantageously employed.

It should be noted that discrete small bodies of glass are glass materials having a size smaller than that of the intended article but enough to be distinguished from one another when they are packed together. Materials obtained by means of water quenching molten glass, granules, small balls, small crushed pieces, small plates or small rods may be used as the discrete small bodies.

By "softening point" is meant that temperature at which the glass has a viscosity of $10^{7.6}$ poises.

Further objects and features of this invention will be understood from following descriptions of embodiments of this invention referring to the annexed drawings.

DETAILED DESCRIPTION OF PREFERRED EMBODIMENTS

Figure 1A:
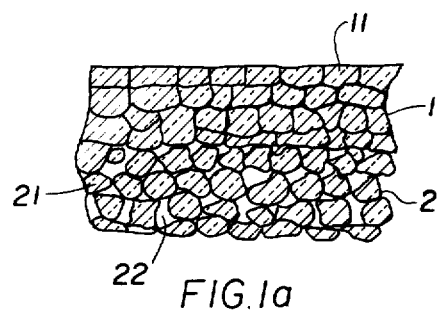
FIG. 1a shows a sectional view of a crystallized glass article according to this invention.
Figure 1B:
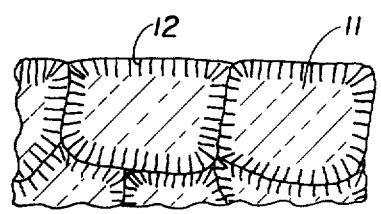
FIG. 1b shows a partial enlarged sectional view of the article.
Figure 2:
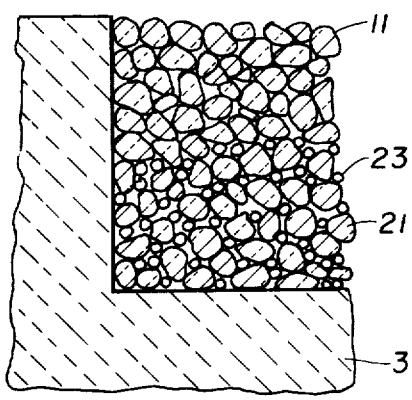

Referring to FIGS. 1 and 2 which schematically show sectional views of a crystallized glass plate according to this invention, the plate comprises a first non-porous crystallized glass layer 1 and a second porous cyrstallized layer 2.

The first layer 1 is formed of discrete small bodies 11 of crystallizable glass fusion-bonded together along their interfaces. Each of the fusion-bonded small bodies has needle-like β-wollastonite crystals 12 which were formed by heat-treatment and extend from the surface thereof into the interior thereof in directions perpendicular to the surface thereof. Accordingly, the appearance of the article has a desirable pattern because light is transmitted in the direction of a needle-like crystal and is not transmitted in other directions. In other words, a region of the surface of the article in which the needle-like crystals are normal to the surface may be transparent and region in which the needle-like crystals are parallel to the surface may appear white.

The second layer 2 is formed of discrete small bodies 21 of crystallizable glass fusion-bonded together, with pores 22 being uniformly distributed in the second layer.

The second layer 2 is fusion-bonded or connected to the first layer 1 by the fact that small bodies 11 in the first layer 1 are fusion-bonded to adjacent small bodies 21 in the second layer 2.

The crystallized glass article or plate has the porous layer 2 and, therefore, has reduced specific gravity. Accordingly, the plate is easy in the transport and mounting operation as a wall plate for buildings. Furthermore the plate can be easily cut into a desired dimension or can be easily drilled comparing with a crystallized glass plate which is non-porous in its entirety. Moreover the porous layer effects as a sound-deadening means and a heat insulating means.

The crystallized glass article having the porous layer is produced from small bodies of crystallizable glass which has a property that when heat-treated at a temperature higher than the softening point of the glass but lower than the liquidus temperature thereof needle-like β-wollastonite crystals are formed, the crystals extending from the surface into the interior of the glass body in a direction generally perpendicular to the surface thereof while it is being softened and deformed.

For the crystallizable glasses having such the property, glasses of the CaO-$Al_2O_3$-$SiO_2$ systems and glasses of the CaO-$Al_2O_3$-$SiO_2$-ZnO systems are employed, as described hereinbefore. The typical compositions of the glasses are shown in the following TABLE.

TABLE

|  | No.1 | No.2 | No.3 | No.4 | No.5 | No.6 | No.7 | No.8 | No.9 | No.10 |
|---|---|---|---|---|---|---|---|---|---|---|
| $SiO_2$ | 57.5 wt.% | 65.0 wt.% | 61.9 wt.% | 57.4 wt.% | 59.1 wt.% | 58.4 wt.% | 63.9 wt.% | 60.6 wt.% | 61.6 wt.% | 59.7 wt.% |
| $Al_2O_3$ | 10.0 | 10.0 | 4.8 | 10.0 | 6.8 | 8.9 | 5.3 | 7.0 | 7.1 | 6.9 |
| CaO | 32.5 | 25.0 | 28.6 | 32.5 | 19.1 | 21.8 | 19.5 | 19.6 | 20.0 | 19.3 |
| ZnO |  |  |  |  | 6.8 | 5.1 | 7.1 | 7.0 | 7.8 | 9.9 |
| BaO |  |  |  |  | 4.3 |  |  |  |  |  |
| $K_2O$ |  |  |  |  | 1.6 | 1.8 | 1.8 | 1.7 | 1.7 | 1.6 |
| $Na_2O$ |  |  | 4.7 |  | 1.7 | 1.8 | 1.8 | 3.5 | 1.8 | 1.7 |
| $B_2O_3$ |  |  |  |  | 0.6 | 2.2 | 0.6 | 0.6 |  | 0.9 |
| $Sb_2O_3$ |  |  |  |  |  |  |  |  |  |  |
| $Fe_2O_3$ |  |  |  |  |  |  |  |  |  |  |
| NiO |  |  |  |  |  |  |  |  |  |  |
| CuO |  |  |  | 0.1 |  |  |  |  |  |  |
|  | No.11 | No.12 | No.13 | No.14 | No.15 | No.16 | No.17 | No.18 | No.19 | No.20 |
| $SiO_2$ | 56.6 wt.% | 59.0 wt.% | 59.0 wt.% | 66.8 wt.% | 72.3 wt.% | 62.6 wt.% | 60.3 wt.% | 58.9 wt.% | 61.2 wt.% | 65.5 wt.% |
| $Al_2O_3$ | 6.5 | 6.8 | 6.8 | 3.3 | 3.3 | 10.4 | 4.6 | 4.5 | 4.6 | 5.0 |
| CaO | 18.3 | 19.1 | 19.1 | 13.6 | 8.3 | 9.9 | 11.0 | 10.8 | 11.1 | 12.0 |
| ZnO | 6.5 | 6.8 | 6.8 | 6.6 | 6.6 | 6.6 | 15.2 | 5.9 | 6.1 | 6.6 |
| BaO | 8.2 | 4.2 | 4.2 | 4.1 | 4.1 | 4.1 | 3.8 | 14.8 | 3.8 | 4.1 |
| $K_2O$ | 1.6 | 1.6 | 1.6 | 2.3 | 2.1 | 2.1 | 2.1 | 2.1 | 1.5 | 2.3 |
| $Na_2O$ | 1.7 | 1.7 | 1.7 | 3.3 | 3.3 | 3.3 | 3.0 | 3.0 | 3.1 | 3.3 |
| $B_2O_3$ | 0.6 | 0.6 | 0.6 |  |  | 0.6 |  |  | 0.5 | 0.6 |
| $Sb_2O_3$ |  |  |  |  |  | 0.4 |  |  | 0.4 | 0.4 |
| $Fe_2O_3$ |  |  | 0.2 |  |  |  |  |  | 7.7 |  |
| NiO |  |  |  |  |  |  |  |  |  | 0.2 |
| CuO |  | 0.2 |  |  |  |  |  |  |  |  |

Referring to FIG. 2, a mixture of the small bodies 21 of the crystallizable glass and inorganic hollow bodies 23 is packed in a mold 3 such as a dish to form a layer having a predetermined thickness. Then similar small bodies 11 of the crystallizable glass are also packed in the mold to form another layer having a predetermined thickness lying over the layer of the mixture. Thereafter, a heat-treatment is carried out at a temperature higher than the softening point of the glass but lower than the liquidus temperature of the glass. As a result, a crystallized glass plate is obtained which comprises a non-porous layer and a porous layer as shown FIGS. 1a and 1b.

Figure 3:
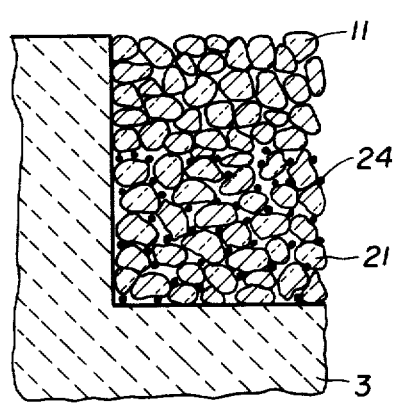
FIGS. 2–4 show sectional views of molds in which small bodies are packed with different pore forming materials.

In another method, foaming agents 24 such as $CaCO_3$, SiC or the like are used in place of the inorganic hollow bodies. The foaming agent 24 is mixed with the small bodies 21 of the crystallizable glass at a suitable rate, for example, of $2 \times 10^{-5}$—$1 \times 10^{-3}$ parts to one part of the small bodies 21, the mixture is packed in the mold 3, as shown in FIG. 3. Similar small bodies 11 of the crystallizable glass are packed in the mold over the layer of the mixture and, thereafter, a heat-treatment is carried out. A crystallized glass plate is obtained which has a non-porous layer and a porous layer as shown in FIGS. 1a and 1b.

Figure 4:
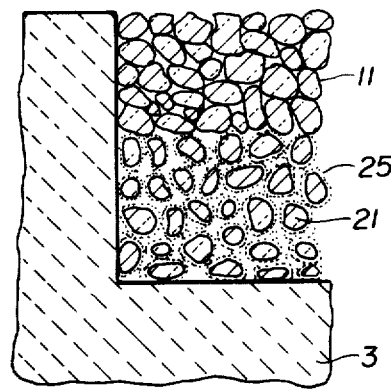

A different method for forming a porous layer beneath a non-porous layer, is to use agent for preventing glass bodies from flowing upon heated. Referring to FIG. 4, each of crystallizable glass bodies 21 is coated with a thin film of the agent, before packed in the mold 3. Similarly, small bodies 11 are packed in the mold over the packed layer of the coated small bodies 21. Upon heat-treated, glass bodies 11 of the upper layer are softened, deformed and fusion-bonded together along their interfaces to form a non-porous integral body layer. But each body 21 of the lower layer is prevented from flowing, so that it is fusion-bonded with adjacent bodies only at contact portions thereof, maintaining pores between non-contact surface portions thereof. Thus, a crystallized glass plate which is characterized by a porous lower layer can be obtained. As an agent for preventing glass from flowing, $Al_2O_3$ (alumina) powder, $CaCO_3$ powder, MgO (magnesia) powder or the like is advantageously employed.

Three examples will be explained hereinafter, wherein the No. 5 glass in the previous TABLE is used for the crystallizable glass.

This glass can readily be obtained by heating the batch at 1400° to 1500° C. The viscosity of the glass is $10^2$ poise at 1440° C, $10^{2.6}$ poise at 1310° C, $10^3$ poise at 1240° C and $10^4$ poise at 1105° C. This glass is characterized by a density of 2.78 g/cm³ as measured at 15° C, a thermal expansion coefficient of $68.8 \times 10 - 7/°$ C, a liquidus temperature of 1229° C, (precipitated crystals being of α-wollastonite), a strain point of 628° C, an annealing temperature of 666° C and a softening point of 845° C. When a small mass of this glass is heated from room temperature at a rate of 120° C per hour, the softening of the glass begins at a temperature of about 850° C and the corners of the small mass become round and are further deformed with elevation of the temperature. At about 1000° C, crystals are formed from the surface toward the interior, and at about 1150° C flow deformation is advanced and crystals grow from the surface toward the interior to a length of about 1.5 mm. When the small mass is maintained at this temperature for 1 hour, the crystals grow to a length of about 5 mm. It was appreciated by an X-ray diffraction method that when the growth of the needle-like crystals had reached the interior, the crystals made up of 35 to 40% of the small mass.

Exmaple 1

Small bodies (having a diameter of 3 mm. or less) of No. 5 glass were obtained by pouring molten glass into water and quenching it. 3200 g of the small bodies were uniformly mixed with 1000 g of inorganic hollow bodies having a diameter of 3-5 mm, which were obtained by baking volcanic glass, and 40 g of polyvinyl alcohol, and were packed in a mold of refractory materials.

The mold is formed in an open-topped hollow shape having a size of $320 \times 480 \times 50$ mm. The inner surface of the mold is coated with $Al_2O_3$ or other refractory powder in order to prevent the glass from adhering on the inner surface during the crystallizing treatment.

3200 g of another small bodies (having a diameter of 1-10 mm.) of No. 5 glass which were obtained by pouring molten glass into water and quenching it, were packed in the mold and on the previously packed layer of the mixture, as shown in FIG. 2.

The small bodies-packed mold was placed in an electric furnace to heat the packed bodies to 1100° C at a rate of 120° C per hour and maintained at this temperature for about 2 hours, following which cooling was conducted at a slow rate, such as 100° C per hour. Thus, the resultant plate comprised a non-porous layer extending from the surface of the plate to a depth of 7.5 mm. and a porous layer of a thickness of 12.5 mm. connected beneath the non-porous layer, as shown in FIGS. 1a and 1b. The non-porous layer was formed of small bodies fusion bonded together, each of the small bodies having needle-like β-wollastonite crystals extending from the surface thereof into the interior thereof in a direction perpendicular to the surface of the small body. The non-porous layer was imparted a surface pattern defined by the contours of the small bodies due to the difference of the orientation of the crystals. The lower porous layer comprised fusion-bonded small bodies of glass which was crystallized and the inorganic hollow bodies which were uniformly distributed in the layer and fusion-bonded to adjacent small bodies of glass.

The crystallized plate has a reduced specific gravity of 2.2. When the crystallized glass (which is 20 mm. in the thickness) was machined or cut at a cutting rate of 60 cm/minute by the use of a cutter driven by an electric motor, the load current flowing the motor was 1.3 A. This was compared with a specific gravity of 2.8 and a cutting load current of 1.6 A. of a non-porous crystallized glass plate (without porous layer) having a thickness of 15 mm. which was produced by a heat-treatment of only similar crystallizable glass bodies.

EXAMPLE 2

Small bodies (having a diameter of 3 mm. or less) of No. 5 glass were prepared similarly as in Example 1. 3200 g of the small bodies were uniformly mixed with 480 mg of SiC powder (having a size of 26-31μ) and were packed in a similar mold as in Example 1. Then, 3200 g of another crystallizable glass small bodies having a diameter of 1-10 mm., which were similarly prepared by a water quenching method, were packed on the previously packed layer of the mixture in the mold, as shown in FIG. 3. Thereafter, a crystallized glass plate was obtained by a similar heat-treatment as in FIG. 1, which plate comprises a non-porous layer of 7.5 mm. thickness characterized by a surface pattern and a porous layer of 12.5 mm. thickness connected beneath the non-porous layer, as shown in FIGS. 1a and 1b, similarly as in Example 1. It is noted that the lower layer becomes porous by the fact that SiC decomposes to develop $CO_2$ gas at the heat-treatment for fusion-bonding and crystallizing small bodies of glass.

The resultant crystallized plate was 20 mm. in the thickness, 1.7 in the specific gravity, and 1.0 A. in the cutting load current.

EXAMPLE 3

200 g. of similar No. 5 crystallizable glass small bodies having a diameter of 3 mm. or less were uniformly mixed with 10 g. of calcium carbonate which was suspended in water of 10 cc. to coat each small body with a thin film of the $CaCO_3$, and were packed in a mold which is similar as in Example 1 but has a dimension 100 × 100 × 30 mm. Then, 200 g. of similar No. 5 glass small bodies having a diameter 1-10 mm. were packed on the previously packed layer in the mold, as shown in FIG. 4. Thereafter a crystallized glass plate was obtained by a similar heat-treatment as in Example 1. The plate, also comprises a non-porous layer having a surface pattern and a porous layer connected beneath the non-porous layer. The thickness of the non-porous layer and the porous layer was 7.2 mm. and 12.8 mm., respectively.

It was confirmed that small bodies in the lower or porous layer maintained their previous shapes and were fusion-bonded together at contact portions between adjacent ones, with maintaining spaces at non-contact portions therebetween. Namely, $CaCO_3$ coating effects to prevent the glass from flowing during the heat-treatment, so that the spaces between adjacent small bodies may be maintained as pores.

The resultant plate having a thickness of 20 mm. was 2.2 in the specific gravity and 1.4 A. in the cutting load current.

Specific examples have been described for exemplarily explaining this invention, but this invention should not be restricted to the examples but various modifications and designations can be easily made within the scope of this invention. A required surface pattern can be obtained by use of first small bodies of crystallizable glass having a shape corresponding the pattern, and a rate of the thickness of the non-porous layer and the porous layer can be easily controlled by varying amounts of first small bodies and the mixtures of second small bodies with pore forming agents. Moreover, a crystallized glass plate can be easily made which comprises a porous layer between two non-porous layers wherein desired surface patterns appear on opposite surfaces of the plate.

What is claimed is:

1. A method for producing a crystallized glass article comprising the steps of:
    preparing first discrete small bodies of crystallizable glass, each of said first bodies having a property that when heat-treated at a temperature higher than the softening point of the glass but lower than the liquidus temperature thereof needle-like $\beta$-wollastonite crystals are formed, said crystals extending from the surface into the interior of the body in a direction generally perpendicular to the surface of the body while it is being softened and deformed,
    preparing a mixture of second discrete small bodies and pore forming materials uniformly distributed in said mixture, each of said second bodies having a property that when heat-treated at said temperature higher than the softening point of said first body glass but lower than the liquidus temperature of said first body glass crystals are formed while it is being softened and deformed,
    packing said first bodies and said mixture into a mold to form a first layer of said first bodies extending from a surface of the pack to a predetermined depth and a predetermined thickness of second layer of said mixture beneath said first layer,
    heat-treating said first bodies and said mixture in said mold at a temperature higher than the softening point of said first body glass but lower than the liquidus temperature of said first body glass until needle-like $\beta$-wollastonite crystals are formed in each first body and first bodies and second bodies are fusion-bonded together,
    and thereafter cooling the resultant fusion-bonded body, whereby a crystallized glass article is obtained which comprises a first non-porous layer extending from a surface of the article to a predetermined depth and being characterized by a surface pattern defined by said first bodies forming a surface layer of said first layer due to a difference of orientation of the needle-like $\beta$-wollastonite crystals, and a second porous layer having a predetermined thickness beneath said first non-porous layer and being connected to said first non-porous layer.

2. The method as claimed in claim 1, wherein said pore forming materials are inorganic hollow small bodies which are prepared by baking volcanic glass.

3. The method as claimed in claim 1, wherein said pore forming materials are powdered foaming agent, said foaming agent acting during said heat-treatment to form pores in said second layer resulted by said heat-treatment.

4. The method as claimed in claim 3, wherein said foaming agent is one of calcium carbonate and silicon carbide, said agent decomposing during said heat-treatment to develop $CO_2$ gas to form pores in said second layer resulted by said heat-treatment.

5. The method as claimed in claim 1, wherein said pore forming materials are agent for preventing said second bodies from flowing at said heat-treatment, said second bodies being coated with said preventing agent in the mixture.

6. The method as claimed in claim 5, wherein said preventing agent is one of alumina powder, magnesia powder and calcium carbonate powder, the powder coating a surface of each of the second small bodies.

* * * * *